US007913108B1

(12) United States Patent
French et al.

(10) Patent No.: US 7,913,108 B1
(45) Date of Patent: Mar. 22, 2011

(54) SYSTEM AND METHOD FOR IMPROVING DISK DRIVE PERFORMANCE DURING HIGH FREQUENCY VIBRATION CONDITIONS

(75) Inventors: F. William French, Harvard, MA (US); Stephen Richard Ives, West Boylston, MA (US); Thomas M. De Lucia, Milford, MA (US); Jeffrey R. Berenson, Milford, MA (US); Michael D. Garvey, Brimfield, MA (US)

(73) Assignee: EMC Corporation, Hopkinton, MA (US)

( * ) Notice: Subject to any disclaimer, the term of this patent is extended or adjusted under 35 U.S.C. 154(b) by 441 days.

(21) Appl. No.: 11/391,104

(22) Filed: Mar. 28, 2006

(51) Int. Cl.
*G06F 11/07* (2006.01)

(52) U.S. Cl. .............................................. 714/5; 714/24

(58) Field of Classification Search ................ 714/5, 24, 714/42, 44
See application file for complete search history.

(56) References Cited

U.S. PATENT DOCUMENTS

| 5,369,704 | A  | * | 11/1994 | Bennett et al. ................ 715/205 |
| 5,696,645 | A  | * | 12/1997 | Laughlin ......................... 360/75 |
| 5,968,182 | A  | * | 10/1999 | Chen et al. ........................ 714/5 |
| 6,345,366 | B1 |   | 2/2002  | Asano et al. ...................... 714/2 |
| 6,434,711 | B1 | * | 8/2002  | Takiyanagi ....................... 714/8 |
| 6,445,531 | B1 | * | 9/2002  | Gaertner et al. ........... 360/78.06 |
| 6,530,034 | B1 | * | 3/2003  | Okada et al. ...................... 714/5 |
| 6,633,448 | B1 | * | 10/2003 | Smith et al. ..................... 360/69 |
| 6,937,417 | B2 | * | 8/2005  | Nagaki et al. ................... 360/75 |
| 6,965,487 | B2 | * | 11/2005 | Hanada et al. .................. 360/69 |
| 7,088,544 | B2 | * | 8/2006  | Jeong et al. ..................... 360/75 |
| 7,389,379 | B1 | * | 6/2008  | Goel et al. ..................... 711/112 |
| 7,395,451 | B2 | * | 7/2008  | Takahashi et al. ................. 714/5 |
| 2002/0131192 | A1 | * | 9/2002  | Feliss et al. .................... 360/60 |
| 2003/0091334 | A1 | * | 5/2003  | Noguchi ......................... 386/70 |
| 2003/0103287 | A1 | * | 6/2003  | Agematsu ....................... 360/60 |
| 2003/0140269 | A1 | * | 7/2003  | Ishimoto et al. .................. 714/5 |
| 2003/0206102 | A1 | * | 11/2003 | Joao ........................... 340/539.1 |
| 2004/0027936 | A1 | * | 2/2004  | Ishikawa .................... 369/44.27 |
| 2004/0078508 | A1 | * | 4/2004  | Rivard .............................. 711/4 |
| 2004/0153844 | A1 | * | 8/2004  | Ghose et al. .................... 714/42 |
| 2004/0230719 | A1 | * | 11/2004 | Wu et al. ......................... 710/33 |
| 2004/0234168 | A1 | * | 11/2004 | Nakano et al. ................ 382/305 |
| 2005/0083801 | A1 | * | 4/2005  | Kuo et al. .................. 369/44.32 |

(Continued)

OTHER PUBLICATIONS

Symmetrix DMX: Reliability, Availability, and Serviceability;2003; EMC Corporation.

(Continued)

*Primary Examiner* — Gabriel L. Chu
*Assistant Examiner* — Chae Ko
(74) *Attorney, Agent, or Firm* — Guerin & Rodriguez, LLP; Michael Rodriguez

(57) ABSTRACT

Described are a system and method for improving the performance of a disk drive in a data storage system by enabling the disk drive to "ride through" events that can induce disk drive errors. In response to an error message received from a disk drive, a disk director temporarily places the disk drive into a wait state. While in the wait state, the disk drive is prevented from shutting down, despite the current error and any subsequent errors that the disk drive may experience. The disk drive may continue to service I/O requests while in the wait state, with the disk director monitoring the disk drive performance. After the disk drive exits the wait state, the disk director can determine from the monitored results whether to shut down the disk drive or to permit the disk drive to return to normal operation.

22 Claims, 4 Drawing Sheets

U.S. PATENT DOCUMENTS

2005/0160189 A1* 7/2005 McNeill et al. .................... 710/1
2006/0069947 A1* 3/2006 Takahashi et al. ................ 714/6
2006/0098545 A1* 5/2006 Tsuchiya et al. ........... 369/53.18
2006/0109581 A1* 5/2006 Lee et al. ........................ 360/60
2007/0258164 A1* 11/2007 Jun ................................ 360/75

OTHER PUBLICATIONS

What's Going on Inside the Box?: ISV Access to Symmetrix Performance and Utilization Metrics; Jan. 2000; EMC Corporation.

* cited by examiner

US 7,913,108 B1

SYSTEM AND METHOD FOR IMPROVING DISK DRIVE PERFORMANCE DURING HIGH FREQUENCY VIBRATION CONDITIONS

FIELD OF THE INVENTION

The invention relates generally to data centers and data storage systems. More particularly, the invention relates to a system and method for improving the performance of disk drives of a data storage system.

BACKGROUND

Many data centers have fire suppressant apparatus located in proximity of their data storage systems. During a fire-suppressant event, high-pressure gas discharges could potentially cause the disk drives of the data storage systems to become "not ready." The high-pressure gas discharge can impart high frequency, high acceleration vibrations to the cabinet of the data storage system. The vibration reaches the disk drives and can cause the head of the disk drive to move off-track.

After a number of failed write or read attempts, the disk drive will designate regions of the disk drive platter as non-functional. Data storage systems experiencing a gas-discharge event have reported "data unavailable" (DU), and in some instances, into "data loss" (DL) errors. Enough of these types of errors can cause an entire disk drive to become "not ready" in anticipation of the complete failure of the disk drive and to provide ample opportunity to protect the integrity of data while the disk drive remains partially functional. However, if not for the gas-discharge event, the disk drive could be fully functional, and shutting down the disk drive an unnecessarily severe corrective action.

SUMMARY

In one aspect, the invention features a method for improving performance of a disk drive in a data storage system. The method comprises receiving an error message from the disk drive and placing the disk drive into a wait state in response to the error message. While the disk drive is in the wait state, the disk drive is prevented from shutting down so that the disk drive can continue to service I/O requests.

In another aspect, the invention features a data storage system comprising a disk director receiving an error message from a disk drive. The disk director includes a processor that executes program code. The program code includes program code for placing the disk drive into a wait state in response to the error message, and program code for preventing the disk drive from shutting down while the disk drive is in the wait state so that the disk drive can continue to service I/O requests.

In still another aspect, the invention features a data storage system comprising a disk drive and a storage processor in communication with the disk drive. The storage processor receives an error message from the disk drive and places the disk drive into a wait state in response thereto for a predefined period. While in the wait state, the disk drive is prevented from shutting down so that the disk drive can continue to service I/O requests.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Applicants recognized the problem that during a fire-suppressant event, high-pressure gas discharges could cause disk drives of a data storage system to go "not ready." Data storage systems embodying the invention can "ride through" such high acceleration, high frequency environmental events. In brief overview, the data storage system receives an error message from a disk drive and, in response to this error message, places the disk drive into a wait state for a predefined period, also referred to herein as a "grace period." While in this wait state, the disk drive does not shut down (i.e., go "not ready"), the disk drive may experience additional I/O errors. Rather, a host system communicating with the data storage system can continue to initiate I/O operations to the disk drive, while the data storage system monitors the success or failure of such I/O operations.

Upon the completion of the grace period, the disk drive exits the wait state and data storage system determines whether the disk drive should remain operational or be taken offline. The basis of this determination may be the past I/O performance of the disk drive during this grace period. If the disk drive performs successfully during the grace period, the data storage system may transition the disk drive from the wait state to a normal mode of operation before the grace period expires. Another basis may be the successful or unsuccessful performance of the next I/O operation to the disk drive after the disk drive exits the wait state. The data storage system does not use a grace period that is too long so as to jeopardize the effectiveness of data protection mechanisms (e.g., there remains ample time after the expiration of the grace period for the data on the potentially failing disk drive to be transferred to another disk drive, if need be).

Figure 1:
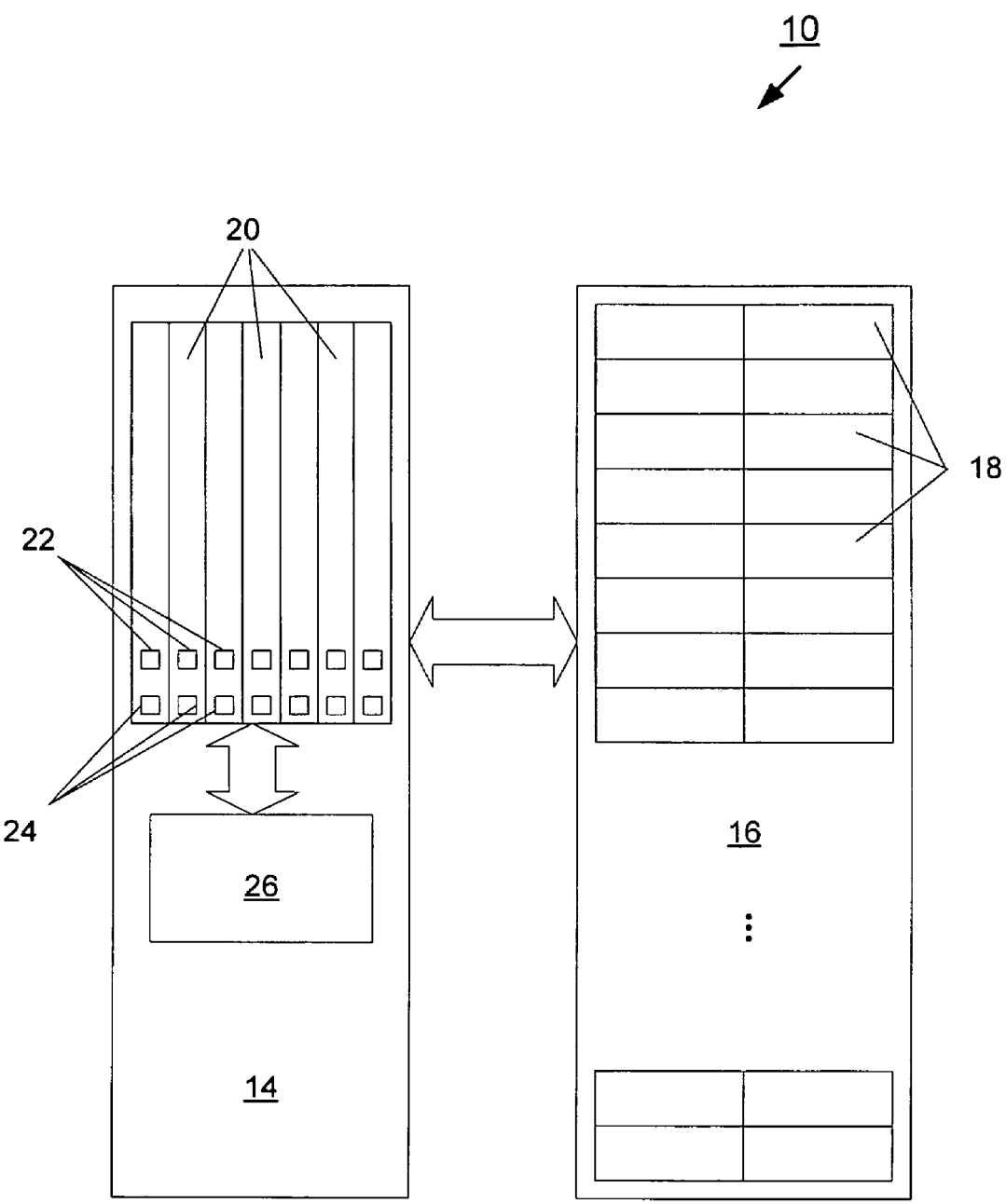
FIG. 1 is a block diagram of an embodiment of data storage system in which aspects of the invention may be implemented.

FIG. 1 shows an embodiment of a data storage system 10 in which aspects of the invention may be implemented. The data storage system 10 includes a storage processor enclosure 14 and a disk array enclosure 16 having a plurality of disk drives 18 (e.g., Fibre Channel drives). In one embodiment, the data storage system 10 is a Symmetrix DMX-800 system, produced by EMC Corporation of Hopkinton, Mass.

The storage processor enclosure 14 has a plurality of disk directors 20. Each disk director 20 is in communication with a portion of the disk drives 18 arranged in a loop (e.g., a Fibre Channel loop). In one embodiment, a pair of redundant disk directors 20 is used to access each disk drive 18, with each disk director 20 of a redundant pair connecting to a different loop. In general, a disk director is responsible for moving data between the disks and cache (or global memory) 26 in response to I/O write and read requests issued to the data storage system 10 from a host system (not shown).

In addition, each disk director 20 includes a processor 22 and program code 24 (e.g., microcode). Execution of the program code 24 by the processor 22 results in improved performance of the disk drives 18 in accordance with the principles of the invention, as described herein in connection with FIG. 3 and FIG. 4.

Figure 2:
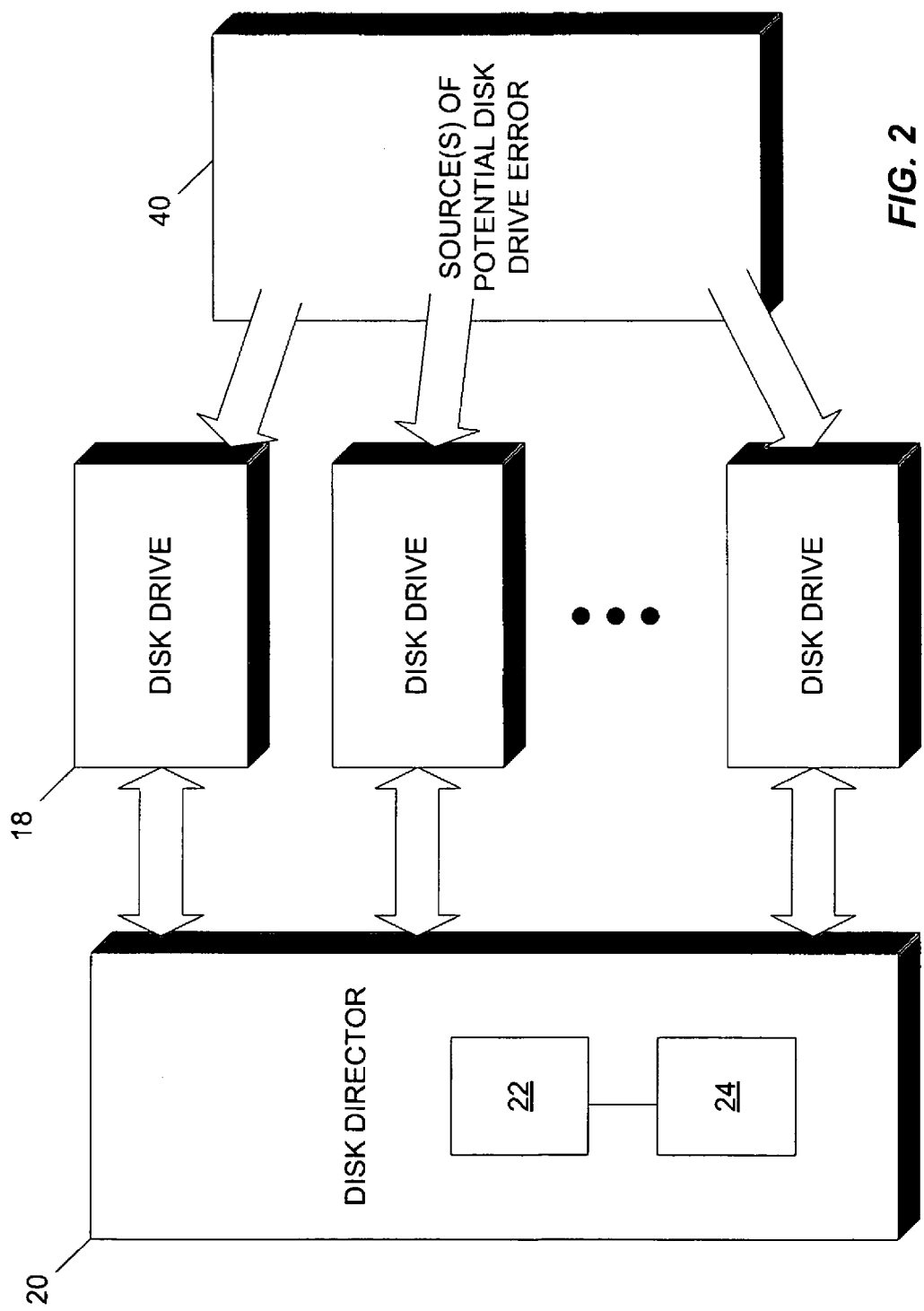
FIG. 2 is a schematic representation of the communication between a disk director of the data storage system and a plurality of disk drives.

FIG. 2 shows a schematic diagram of a representative one of the disk directors 20 in communication with a plurality of disk drives 18. During normal operation, the disk director 20 may send I/O requests to one or more of the disk drives 18 for reading or writing data. If one of the disk drives 18 is unable to successfully service the I/O request, that disk drive 18 posts (i.e., reports) an error code (i.e., an error message) to the disk director 20.

The types of error messages that a disk drive 18 can report varies, depending, for example, upon the type and vendor of the disk drive. One exemplary type of error message indicates that the head of the disk drive is off track (i.e., head instability), and is therefore causing drive write errors. Such error messages may be referred to as position error signals (PES). Other examples include error messages that indicate that the disk drive has reset itself, that data are unavailable, that data have been lost, that there have been protocol (e.g., SCSI) errors, and that the disk drive is not ready (NR). A "not ready" error message is indicative of a fatal error; in effect, the disk drive is shutting down.

Although disk drive errors can be indicative of a defective or malfunctioning disk drive and should result in causing the disk drive to shut down, there are occasions when the errors are not attributable to a catastrophically failing disk drive. On such occasions, shutting down the disk drive because of a reported error may be unwarranted.

In FIG. 2, block 40 represents a source of potential disk drive errors. Examples of error sources include, but are not limited to, a gas discharge proximate to the disk array enclosure 16, a seismic occurrence, an inadvertent bump or jarring of the disk array enclosure 16, and a floor vibration. Such examples can be referred to as environmental events. Environmental events typically affect more than one disk drive simultaneously and persist briefly (i.e., may conclude within a few seconds). Other types of error sources may be peculiar to a particular disk drive, affecting only that disk drive or type of disk drive, for example, a software bug that infrequently causes the disk drive to reset itself. Shutting down a disk drive because of such sources of error may be unnecessary—the disk drive is not catastrophically failing and is still capable of servicing I/O requests after the event causing the failure has ceased. In brief overview, the program code 24 executed by the processor 22 enables the disk drive 18 to "ride through" error-inducing events that otherwise would cause the disk drive 18 to shut down.

Figure 3:
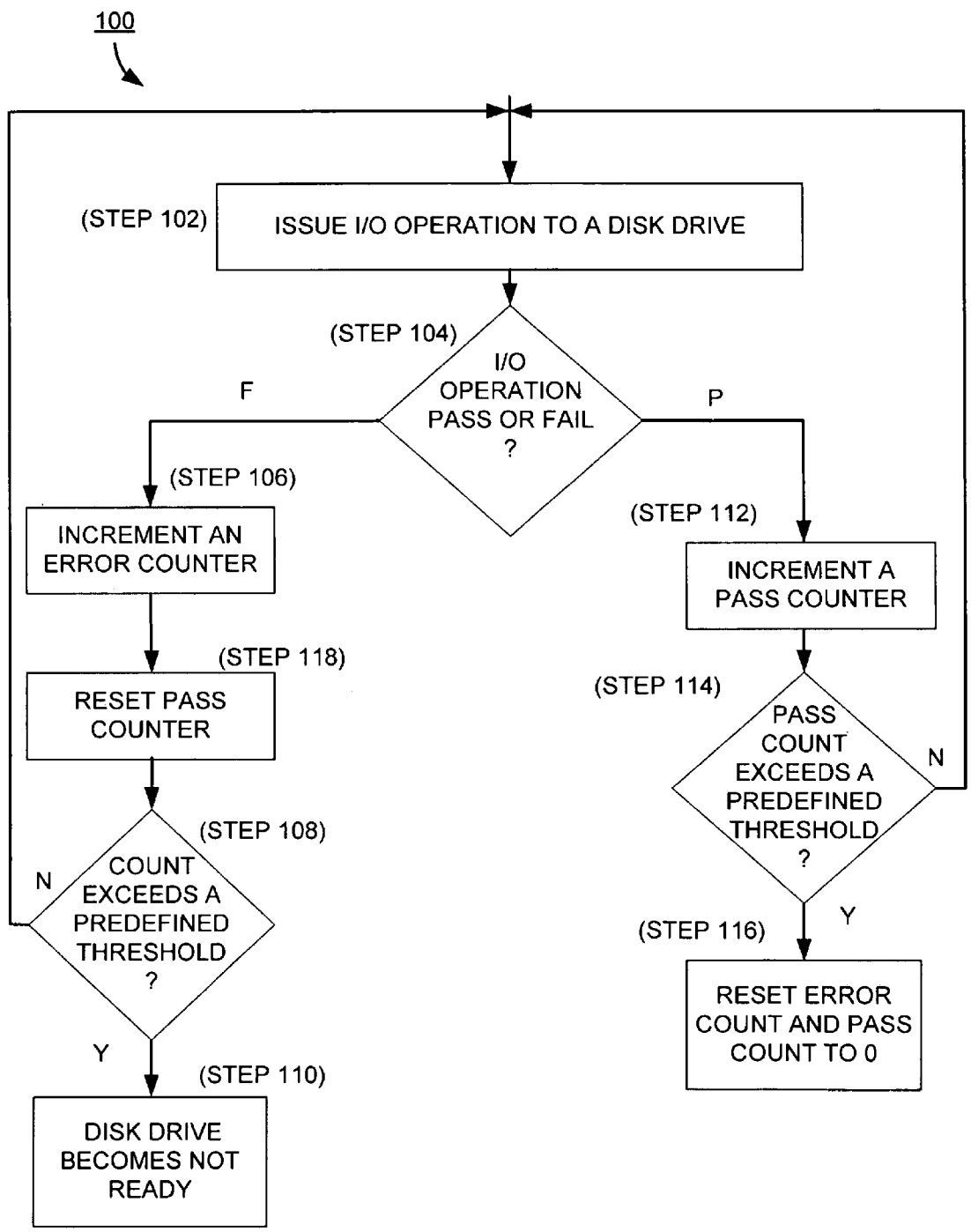
FIG. 3 is a flow diagram of an embodiment of a process for keeping a disk drive operational despite errors being posted by the disk drive.

FIG. 3 shows an embodiment of a process 100 for keeping a disk drive 18 operational although the disk drive 18 is reporting errors to the disk director 20. The disk director 20 initiates (step 102) an I/O operation at a given disk drive—for example, on behalf of an I/O request from the host system—and determines (step 104) whether the I/O operation succeeds or fails. If the disk drive 18 reports an error code, the disk director 20 increments (step 106) an error counter. The disk director 20 may maintain the error counter to count one or more specific types of errors or to count every error that occurs, regardless of error type. Alternatively, there can be multiple error counters, one counter for each type of error. The disk director 20 compares (step 108) the count in the incremented error counter to a predefined threshold (e.g., ten reported failed I/O operations).

If, at step 110, the count in the error counter exceeds the predefined threshold, the disk drive 18 enters the NR state (i.e., shuts down). Before the disk drive 18 shuts down, the disk director 20 may take action to protect the integrity of the data on that disk drive 18. Otherwise, if the count is at or below the threshold, the disk director 20 can continue to send I/O requests to the disk drive (step 102). Thus, the process 100 prolongs the "uptime" of this disk drive, despite the reported errors, by requiring the number of errors to rise above a threshold selected to be more accurately indicative of a failing disk drive than one, two, or a few errors.

The process 100 also includes a mechanism for resetting the error counter when the disk drive 18 attains a performance level signifying that the disk drive is currently consistently operating properly. If, at step 104, an I/O operation is successful, the disk director 20 increments (step 112) a pass counter and compares (step 114) the count in the pass counter to a predefined threshold. When the count in the pass counter exceeds a particular threshold (e.g., 150 good I/O operations), the disk director 20 resets (step 116) the error counter—and pass counter—to zero. Thus, the current good performance of the disk drive 18 is sufficient to erase the previous history, if any, of poor performance. If a failed I/O operation occurs before the count in the pass counter reaches the predefined threshold, the disk director 20 resets (step 118) the pass counter to zero, thus requiring a prerequisite number of consecutive successful I/O operations before deeming the disk drive to be sufficiently operational to erase any previous record of poor I/O performance.

Using the process 100 to keep a disk drive online can have limited success, particularly in an environment exposed to high acceleration, high frequency environmental events. Depending upon the severity of the event, the magnitude of errors can rapidly exceed the predefined threshold for the error counter. As a result, the disk director 20 will shut down a disk drive, although, but for the environmental event, the disk drive is performing normally.

Figure 4:
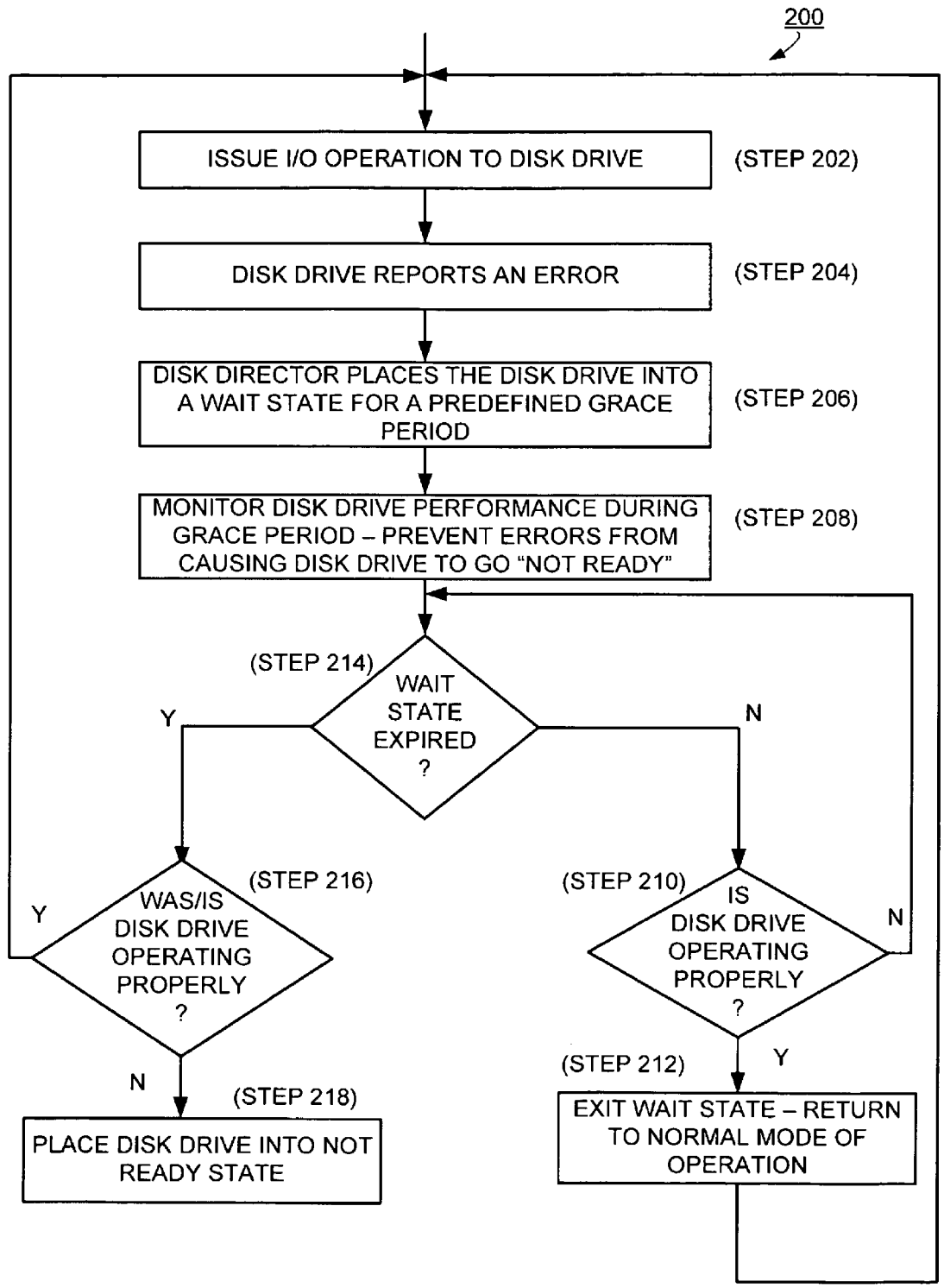
FIG. 4 is a flow diagram of another embodiment of a process for keeping a disk drive operational despite errors being posted by the disk drive.

FIG. 4 shows an embodiment of an another process 200 for keeping a disk drive operational although the disk drive 18 is reporting errors to the disk director 20. At step 202, the disk director 20 issues an I/O operation to a given disk drive 18. When the I/O operation is unsuccessful, the disk drive 18 reports (step 204) an error message to the disk director 20. In response to the error message, the disk director 20 determines (step 206) whether to place the disk drive 18 into a wait state for, at most, a predefined grace period.

Different embodiments of the process 200 can use different criteria to determine whether to place the disk drive 18 into the wait state. For example, in one embodiment the disk drive 18 enters the wait state upon a first occurrence of an error of any type. In another embodiment, the criteria are that the error reported by the disk drive be one of a specific type or of specific related types before placing the disk drive into the wait state. Other embodiments of criteria include detecting an error rate (e.g., of any error type, of a specific error type, or of similar or related error types) above a certain threshold.

The duration of this predefined grace period depends upon the particular source of error that the data storage system is attempting to nullify by executing the process 200. For example, the most severe deleterious effects of vibrations on a disk drive occur within the initial seconds of a rapid gas discharge and then fade considerably. For such a situation, a grace period lasting approximately 10 to 15 seconds is sufficient time to ride through the environmental event. A shorter grace period, e.g., 2 to 5 seconds, can be sufficient for other sources of error, for example, the above-described software bug that causes the disk drive to reset itself infrequently.

Certain considerations, such as the need to ensure protection of the integrity of the data on the disk drive and timeout limits for an I/O request used by host systems, place an upper limit on the duration of the grace period. For example, if I/O requests from a host system timeout in 30 seconds, the duration of the grace period should be less than 30 seconds (with sufficient guard band to avoid a host timeout before the disk director can decide whether to shut down the disk drive or to let the disk drive remain operational).

While the disk drive 18 is in this wait state, the host system can continue to issue I/O requests to the data storage system that result in I/O operations to the disk drive. The disk director 20 monitors (step 208) the success or failure of such I/O operations. Additional error occurrences reported by the disk drive during this grace period do not cause the disk drive to become "not ready"; the disk director 20 defers shutting down the disk drive, giving the disk drive opportunity during this grace period to return to servicing I/O operations correctly.

In one embodiment, the disk director can determine (step 210) from the monitoring of the I/O operations that the disk drive is successfully performing I/O operations before the grace period expires. In this embodiment, the disk director may transition (step 212) the disk drive out of the wait state and into a normal mode of operation—rather than wait for the grace period to expire. The basis for this determination can be, for example, that the disk drive executed a certain number or achieved a certain rate of consecutive successful I/O operations during the grace period. Alternatively, the disk director can wait until the grace period expires (step 214) to conclude, based on the monitored I/O operations, that the disk drive is operating correctly and to return (step 202) the disk drive to normal operation.

If the disk director determines (step 216) from the monitored I/O operations that the disk drive is not operating correctly, for example, because the disk drive continues to report errors during the grace period, the disk director places (step 218) the disk drive into the NR state after the grace period expires. Alternatively, or in addition, the disk director can base the decision (i.e., step 216) for shutting down the disk drive upon the successful or unsuccessful performance of the next I/O operation issued to the disk drive after the disk drive exits the wait state.

As described above, each disk director 20 communicates with a plurality of disk drives 18. Because some types of environmental events, such as a gas discharge, typically affect more than one disk drive simultaneously, more than one disk drive may report errors in response to an event. From the error messages received from these disk drives, the disk director 20 can determine that multiple drives are reporting the same or related error codes within a given window of time. Any statistical significance associated with multiple disk drives failing concurrently can serve as an indicator of an environmental event that is affecting the data storage system, and thus serve as a criterion for placing one or more disk drives into the wait state. In one embodiment, the disk director can use this cumulative information to place each disk drive with which it is in communication into the wait state, irrespective of whether that disk drive has reported an error. In another embodiment, the disk directors of the data storage system communicate with each other, to notify each other disk director of the number of and time when the disk drives are reporting errors. With this information from the other disk directors, each disk director can make a determination of whether to place its disk drives into the wait state.

In addition, from the cumulative information (based on a single disk director or on multiple disk directors), the data storage system may raise an alarm (e.g., reported by modem to a field service center, recorded into a log file, or a combination thereof) upon determining that multiple disk drives are simultaneously failing. Although the disk drives are able to continue operating because of the processes described herein so that the data storage system does not need field service, the alarm can serve as a recordation of an event that can be later referred to should the data storage system experience disk drive errors in the future. The recordation may assist personnel to determine whether any subsequent errors are directly or indirectly attributable to a past environmental event.

Aspects of the present invention, for example, the program code 22 (FIG. 1 and FIG. 2), may be implemented as one or more computer-readable software programs embodied on or in one or more articles of manufacture. The article of manufacture can be, for example, any one or combination of a floppy disk, a hard disk, hard-disk drive, a CD-ROM, a DVD-ROM, a flash memory card, an EEPROM, an EPROM, a PROM, a RAM, a ROM, or a magnetic tape. In general, any standard or proprietary, programming or interpretive language can be used to produce the computer-readable software programs. Examples of such languages include C, C++, Pascal, JAVA, BASIC, Visual Basic, and Visual C++. The software programs may be stored on or in one or more articles of manufacture as source code, object code, interpretive code, or executable code.

While the invention has been shown and described with reference to specific preferred embodiments, it should be understood by those skilled in the art that various changes in form and detail may be made therein without departing from the spirit and scope of the invention as defined by the following claims. For example, other embodiments may implement the functions performed by the program code 24 in hardware or in a combination of hardware and software.

What is claimed is:

1. A method for improving performance of a disk drive in a data storage system, the method comprising:
   receiving an error message from the disk drive indicative of a disk drive error that is of sufficient significance to cause the disk drive to be shut down;
   placing the disk drive into a wait state that persists for, at most, a defined period in response to the error message;
   deferring shutting down the disk drive while the disk drive is in the wait state; and
   continuing, by the disk drive, to service I/O (input/output) requests while in the wait state, even if the disk drive issues one or more additional error messages while operating in the wait state.

2. The method of claim 1, further comprising monitoring a performance of the disk drive while the disk drive is operating in the wait state.

3. The method of claim 2, further comprising removing the disk drive from the wait state before the defined period expires when the monitored performance indicates that the disk drive is capable of servicing I/O requests successfully.

4. The method of claim 2, further comprising restoring the disk drive to normal operation after the defined period expires when the monitored performance indicates that the disk drive is capable of servicing I/O requests successfully.

5. The method of claim 2, further comprising shutting down the disk drive after the defined period expires when the monitored performance indicates that the disk drive is incapable of consistently servicing I/O requests successfully.

6. The method of claim 1, further comprising the step of determining to place the disk drive into the wait state based on a type of the error message.

7. The method of claim 1, further comprising the step of determining to place the disk drive into the wait state based on an error rate.

8. The method of claim 1, further comprising removing the disk drive from the wait state and shutting down the disk drive after the disk drive reports a number of unsuccessful I/O operations while the disk drive is operating in the wait state.

9. The method of claim 1, wherein the step of placing the disk drive into the wait state includes the steps of receiving disk drive errors from a plurality of different disk drives over a period.

10. The method of claim 9, further comprising the steps of:
determining that the disk drive errors are indicative of an event that induced the plurality of disk drives to report the disk drive errors; and
raising an alarm that records the event.

11. A data storage system comprising:
a disk director receiving an error message from a disk drive indicative of a disk drive error that is of sufficient significance to cause the disk drive to be shut down, the disk director having a processor executing program code, the program code including:
program code for placing the disk drive into a wait state that persists for, at most, a defined period in response to the error message;
program code for deferring shutting down the disk drive while the disk drive is in the wait state; and
program code for continuing, by the disk drive, to service I/O (input/output) requests while in the wait state, even if the disk drive issues one or more additional error messages while operating in the wait state.

12. The data storage system of claim 11, wherein the program code further comprises program code for monitoring a performance of the disk drive while the disk drive is in the wait state.

13. The data storage system of claim 12, further comprising program code for removing the disk drive from the wait state before the defined period expires when the monitored performance indicates that the disk drive is capable of servicing I/O requests successfully.

14. The data storage system of claim 12, further comprising program code for returning the disk drive to normal operation after the defined period expires when the monitored performance indicates that the disk drive is capable of servicing I/O requests successfully.

15. The data storage system of claim 12, further comprising program code for shutting down the disk drive after the defined period expires when the monitored performance indicates that the disk drive is incapable of consistently servicing I/O requests successfully.

16. The data storage system of claim 11, wherein the program code further comprises program code for determining to place the disk drive into the wait state based on a type of the error message.

17. The data storage system of claim 11, wherein the program code further comprises program code for determining to place the disk drive into the wait state based on an error rate.

18. The data storage system of claim 11, wherein the program code for placing the disk drive into the wait state includes program code for determining from disk drive errors received from a plurality of different disk drives over a period that the disk drive errors are indicative of an event that is inducing the errors.

19. The data storage system of claim 18, wherein the program code further comprises program code for raising an alarm that records the event that induced the plurality of disk drives to report the disk drive errors.

20. A data storage system comprising:
a disk drive;
a storage processor in communication with the disk drive, the storage processor receiving an error message from the disk drive the disk drive to be shut down, and placing the disk drive into a wait state for, at most, a predefined period in response thereto, wherein shutting down the disk drive is deferred while the disk drive is in the wait state and the disk drive continues to service I/O (input/output) requests while in the wait state, even if the disk drive issues one or more additional error messages while operating in the wait state.

21. The data storage system of claim 20, further comprising means for monitoring a performance of the disk drive while the disk drive is operating in the wait state.

22. The data storage system of claim 20, further comprising means for removing the disk drive from the wait state before the defined period expires when the monitored performance indicates that the disk drive is capable of servicing I/O requests successfully.

* * * * *